United States Patent
Baxter

(10) Patent No.: US 8,963,347 B2
(45) Date of Patent: Feb. 24, 2015

(54) METHODS AND SYSTEMS FOR GENERATING POWER FROM A TURBINE USING PRESSURIZED NITROGEN

(75) Inventor: Larry L. Baxter, Orem, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 696 days.

(21) Appl. No.: 12/745,680

(22) PCT Filed: Dec. 8, 2008

(86) PCT No.: PCT/US2008/014120
§ 371 (c)(1),
(2), (4) Date: Nov. 24, 2010

(87) PCT Pub. No.: WO2009/075897
PCT Pub. Date: Jun. 18, 2009

(65) Prior Publication Data
US 2011/0061385 A1     Mar. 17, 2011

Related U.S. Application Data

(60) Provisional application No. 61/008,802, filed on Dec. 21, 2007, provisional application No. 61/068,192, filed on Mar. 5, 2008.

(51) Int. Cl.
*F01K 25/06* (2006.01)
*F01K 25/10* (2006.01)
(Continued)

(52) U.S. Cl.
CPC .............. *F01K 25/10* (2013.01); *F23L 7/007* (2013.01); *F01K 13/00* (2013.01); *F22B 37/008* (2013.01); *F23J 15/06* (2013.01); *F25J 3/04084* (2013.01); *F25J 3/04533* (2013.01); *F25J 3/04581* (2013.01);
(Continued)

(58) Field of Classification Search
USPC ..................... 60/649, 671; 290/1 R
See application file for complete search history.

(56) References Cited

U.S. PATENT DOCUMENTS

| | | | | |
|---|---|---|---|---|
| 3,950,957 A | * | 4/1976 | Zakon | 62/644 |
| 4,227,374 A | * | 10/1980 | Oxley | 60/651 |
| 5,040,370 A | * | 8/1991 | Rathbone | 60/648 |
| 5,475,980 A | * | 12/1995 | Grenier et al. | 62/646 |
| 5,635,541 A | * | 6/1997 | Smith et al. | 518/703 |
| 5,666,800 A | * | 9/1997 | Sorensen et al. | 60/781 |
| 5,666,823 A | * | 9/1997 | Smith et al. | 62/646 |

(Continued)

FOREIGN PATENT DOCUMENTS

JP    H09170451    6/1997

OTHER PUBLICATIONS

ISR for PCT Application No. PCT/US2008/014120 dated Sep. 24, 2009.

*Primary Examiner* — Kenneth Bomberg
*Assistant Examiner* — Shafiq Mian
(74) *Attorney, Agent, or Firm* — Workman Nydegger

(57) ABSTRACT

An air separation unit is integrated with a power generating plant to improve the efficiency of power generation. The methods and systems improve the efficiency of power generation by utilizing liquid nitrogen from the air separation unit as the working fluid in a turbine. The liquid nitrogen is pressurized while in the liquid state. After warming the pressurized nitrogen stream by cooling the air for the air separator unit, the compressed nitrogen is expanded in a turbine to perform work. After expansion, the nitrogen is vented to ambient air. The nitrogen in its pressurized state can be used for energy storage and/or for smoothing out power demand on a power grid.

18 Claims, 1 Drawing Sheet

(51) Int. Cl.
*F23L 7/00* (2006.01)
*F01K 13/00* (2006.01)
*F22B 37/00* (2006.01)
*F23J 15/06* (2006.01)
*F25J 3/04* (2006.01)

(52) U.S. Cl.
CPC ......... *F25J 3/04612* (2013.01); *F25J 3/04836* (2013.01); *F23J 2215/10* (2013.01); *F23J 2900/15061* (2013.01); *F23L 2900/07001* (2013.01); *F25J 2240/70* (2013.01); *F25J 2260/30* (2013.01); *F25J 2290/62* (2013.01); *Y02E 20/322* (2013.01); *Y02E 20/344* (2013.01); *Y02E 20/346* (2013.01); *Y02E 20/363* (2013.01)
USPC .......................................................... 290/1 R

(56) References Cited

U.S. PATENT DOCUMENTS

| | | | |
|---|---|---|---|
| 5,724,805 A * | 3/1998 | Golomb et al. | 60/783 |
| 6,101,716 A * | 8/2000 | Schulz | 29/890.033 |
| 6,256,994 B1 * | 7/2001 | Dillon, IV | 60/649 |
| 6,263,659 B1 * | 7/2001 | Dillon et al. | 60/783 |
| 6,808,145 B2 * | 10/2004 | Burton | 244/171.1 |
| 2002/0166323 A1 | 11/2002 | Marin et al. | |
| 2003/0010061 A1 * | 1/2003 | Ha et al. | 65/32.5 |
| 2003/0233830 A1 | 12/2003 | Marin et al. | |
| 2004/0016237 A1 | 1/2004 | Marin et al. | |
| 2004/0148961 A1 | 8/2004 | Clodic et al. | |
| 2006/0075779 A1 * | 4/2006 | Higginbotham | 62/643 |
| 2006/0277942 A1 | 12/2006 | Clodic et al. | |

* cited by examiner

METHODS AND SYSTEMS FOR GENERATING POWER FROM A TURBINE USING PRESSURIZED NITROGEN

THE FIELD OF THE INVENTION

The present invention relates to methods and systems for generating power from a turbine using compressed nitrogen.

THE RELEVANT TECHNOLOGY

A significant portion of the world's electrical power is generated in power plants that burn fossil fuels. Electricity is produced by converting fossil fuels to thermal energy which is then used to drive a turbine. In a typical power plant, a fossil fuel is burned to heat water to create steam and the steam is used to drive the turbine. The turbine turns the generator to create electrical power that is distributed using a grid of power lines.

The steam used in a modern power plant is typically recirculated in a closed loop system. Condensing and recirculating the water reduces the amount of water used to run the power plant. In addition, the recirculated water can be economically purified to prevent minerals and other components of common water supplies from damaging the power plant turbine and/or damaging other components of the power plant. The condensation step in this close-looped system is often carried out in a cooling tower using lower grade water.

According to the second law of thermodynamics, a closed-loop cycle can only convert a fraction of the combustion heat into mechanical work. The rest of the heat, called waste heat, is released into a cooler environment during the condensation portion of the cycle. The fraction of heat released into a cooler medium is equal to or larger than the ratio of the absolute temperatures of the cooling system (environment) and the heat source (combustion furnace). Raising the furnace temperature improves the efficiency of the power plant but also increases the steam pressure, thereby complicating the design of the power plant and increasing its cost. Modern power plants are highly optimized for obtaining maximum power using fossil fuels to heat steam and drive a turbine.

BRIEF SUMMARY

The present disclosure relates to methods and systems for efficiently generating power in a turbine using nitrogen. The methods and systems can be used in combination with steam turbines to improve the efficiency of existing steam cycles in power plants. The nitrogen used in the turbine is provided from an air separation unit in the form of liquid nitrogen. The liquid nitrogen is pumped to a pressure of at least 1.8 atmospheres and expanded in a turbine to generate power. After expansion, the nitrogen is vented to ambient air. The pressurized nitrogen can also be used as a stored energy source for smoothing out power demands on power grids.

A nitrogen driven turbine is substantially more efficient at converting thermal energy into work compared to a steam driven turbine. The reason that nitrogen is not typically used in modern power plants is that nitrogen must be compressed for it to be used as the working fluid in a turbine. The inefficiencies associated with compressing nitrogen exceed the efficiencies of heating and expanding nitrogen as compared to steam. Thus, for a closed-loop system, the use of nitrogen to drive a turbine costs more than a comparable steam driven turbine.

The present invention accomplishes an overall improved efficiency by providing a liquid nitrogen-rich stream from an air separation unit and generating power from pressurized nitrogen in an open system. In operating the air separation unit, liquid nitrogen is formed for the purpose of separating nitrogen from oxygen. Therefore, the compression of the gaseous nitrogen is a sunk cost associated with air separation. In the methods and systems of the present invention, the liquid nitrogen is pumped to a pressure of at least 1.8 atmospheres when the nitrogen is in a liquid state. Pressurizing condensed nitrogen is highly efficient as compared to compressing gaseous nitrogen.

Once the nitrogen-rich stream is pressurized, the liquid nitrogen can still be used as a refrigerant in other stages of the air separator (or other system), so long as a desired pressure is maintained. For example, the pressurized nitrogen-rich stream can be used to cool the incoming air in the air separation unit.

The pressurized nitrogen-rich stream is heated for expansion in a nitrogen driven turbine. The pressurized nitrogen-rich stream can be heated using a furnace (e.g., a coal burner) and the thermal energy is converted to work in the turbine. In one embodiment, waste heat from a steam driven turbine is used to warm the nitrogen-rich stream to a first elevated temperature and a furnace is subsequently used to obtain the final desired temperature.

Notably, the expanded nitrogen exiting the turbine is vented to the ambient air. The vented nitrogen is not recirculated. Therefore, there is no need to cool or compress the nitrogen. Using nitrogen from an air separation unit as the working fluid in a turbine can substantially reduce the amount of water needed to operate a power plant since the use of nitrogen does not require the use of a cooling tower or the expenditure of water as the working fluid. The water usage of a system using nitrogen provided as described herein can reduced use of water in a power plant by about 25-30% compared to power plants that generate power exclusively from steam.

The present invention also includes a system for efficiently generating power using a nitrogen-rich stream. The system includes a power generating plant having a turbine configured to generate power and deliver the power to a power grid. The power generating plant also includes a furnace configured to heat a working fluid to be introduced into the turbine. The air separation unit is configured to produce a nitrogen-rich stream in a liquid state. A pump is fluidly coupled to the nitrogen-rich stream and configured to pressurize the nitrogen-rich stream to at least 1.8 atmospheres while the nitrogen is in the liquid state. The system includes a conduit for delivering the pressurized nitrogen-rich stream from the air separation unit to the furnace while maintaining the nitrogen-rich stream under pressure.

In one embodiment, the system is configured to vent nitrogen expanded in the turbine to the ambient air. The nitrogen is vented to the ambient air instead of recompressing the nitrogen due to the inefficiencies associated with compressing gaseous nitrogen.

By coupling power generation with a process that involves cooling and/or compressing nitrogen for a different purpose (i.e., air separation), the present invention can recover a significant portion of the sunk cost of cooling and/or compressing the nitrogen in the air separation unit. The integration of the two or more processes (i.e., air separation unites and power generation) results in efficiencies that cannot be obtained by optimizing the discrete systems separately.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The present disclosure relates to the integration of an air separation unit with a power generating plant to improve the efficiency of power generation. The methods and systems improve efficiency of power generation by utilizing liquid nitrogen from the air separation unit as the working fluid in a turbine. Importantly, the liquid nitrogen is pressurized while in the liquid state. Pressurizing the nitrogen while in the liquid state provides significant improvements in efficiencies compared to compressing the gaseous nitrogen. While transporting and operating the nitrogen stream at pressure requires additional hardware specifications, the improved efficiencies have been found to be more than adequate to compensate for these added requirements.

Prior to expanding the compressed nitrogen in a turbine, the pressurized nitrogen stream can be used to cool the incoming air for the air separator unit. Once the pressurized nitrogen stream reaches ambient or near ambient, the pressurized nitrogen stream can be stored for later use or heated and expanded in a turbine to efficiently generate power.

A pressurized nitrogen-rich stream heated to the same temperature as typical steam turbine inlet temperatures (nominally 600° C.) generates power with approximately three times the efficiency as steam under heated from room temperature to similar temperature at similar pressures. Recompressing the nitrogen would greatly reduce this efficiency to below that of steam, but on a once-through basis, the steam is far more efficient than steam/water and avoids the cooling water load associated with water. This reduces, by at least 25-30%, the amount of cooling water needed for power generation for the portion of the power made from the nitrogen turbine.

Figure 1:
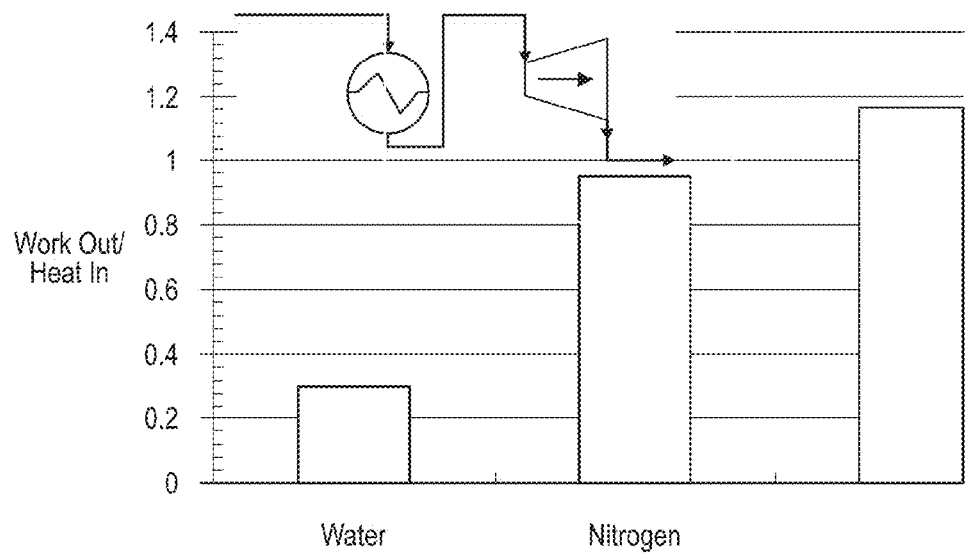
FIG. 1 illustrates a comparison of the ratio of work produced in a turbine to the heat transferred to the working fluid for each of three working fluids in a simple expansion.

FIG. 1 compares the ratio of work produced in a turbine to the heat transferred to the working fluid for each of three working fluids assuming all start at 300 atm and 25° C. and that each is heated to 600° C. at the same pressure and then expanded through a simple turbine (efficiency=75%) to atmospheric pressure. The water/steam cycle has a net ratio of 30% and is a reasonable representation of small-scale Rankine cycle systems without superheat or other sophisticated technologies. Nitrogen, by comparison, has a ratio of approximately 90%, three times higher than steam. That is, the amount of power generated in 90% of the amount of heat put into the already pressurized gas stream. Importantly, this system is an open loop system, not a cycle comparison. Specifically, the energy efficiency costs of recompressing the steam/water cycle are negligible since the cycle forms water, which is easily and efficiently compressed. However, the energy costs of recompressing any gas are very large and would result in cycle efficiencies that are lower than that of water.

The helium data indicate that helium would make an even better working fluid, primarily because it has a low and essentially constant heat capacity. However, in most cases, the source of helium will be too small in comparison to other components of air to be of practical use.

As indicated, more energy is derived from the turbine than is placed into the helium in the form of heat. This emphasizes the point that the energy derived from the turbine includes both energy from the heat and energy from the initial compression. The advantages of this light-gas turbine increase with increasing inlet temperature.

The high-temperature heat used in the nitrogen turbine decreases the amount of heat transferred to the steam turbine. This typically only makes sense if the efficiency advantage is large enough to justify the additional cost of a second turbine and, in a more sophisticated design, as second superheater set.

Nitrogen turbines require no cooling water since nitrogen is vented to the atmosphere at the end of the process. Furthermore, nitrogen systems do not face a realistic limit in exit temperature because of condensation, so the exit gas can be very cool, depending on the inlet temperature and pressure. The cool exit gases and the decrease in cooling water demand both significantly decrease the amount of water required for the steam cycle, potentially by 25-30%.

In one embodiment, the oxygen content remaining in the nitrogen-rich stream is nearly ideally suited for firing in a gas turbine. The compressed, preheated nitrogen-rich gas flowing from the boiler preheat cycle near the end of the process are well suited to gas turbine firing rather than inert nitrogen turbine use, with a corresponding large increase in power generation. However, the $CO_2$ in the resulting gas, while representing a relatively small emission, would require additional process steps if it must be captured.

Figure 2:
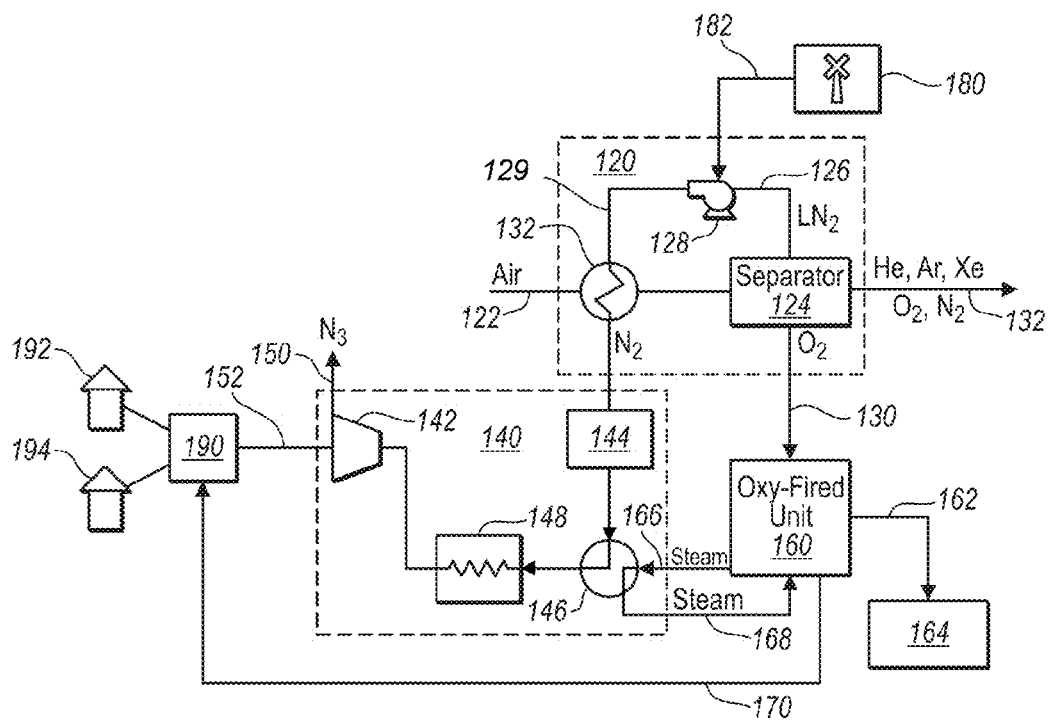
FIG. 2 is a flow diagram of one embodiment of an integrated system according to a disclosed embodiment
Figure 2:
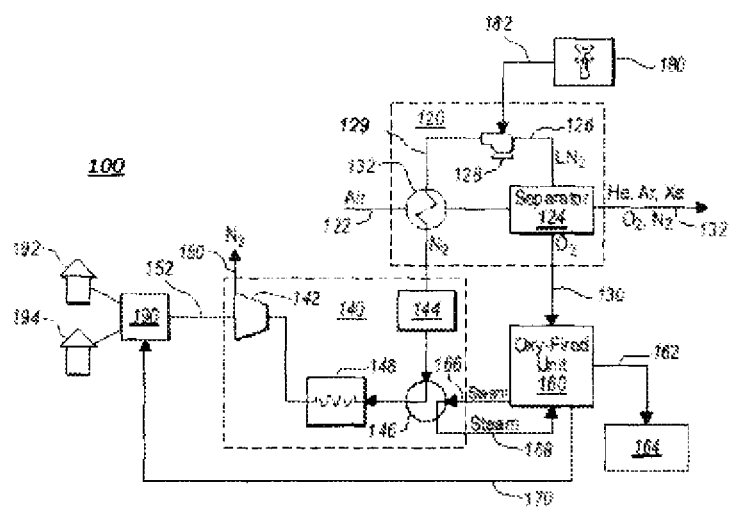

FIG. 2 illustrates an example system according to one embodiment disclosed herein. System 100 shown in FIG. 2 may include an air separation unit 120 (ASU), a nitrogen-powered generation unit 140, a steam powered generation unit 160, an intermittent power source 180, and a power grid 190.

The air separation unit 120 can be any gas or liquid separating system or process for separating two or more gaseous and/or liquid components so long as the process produces a liquid nitrogen stream. Examples of systems that alone or in combination may produce liquid nitrogen streams include, but are not limited to, membrane systems, cryogenic systems, vacuum swing adsorption (VSA) systems, pressure swing adsorption (PSA) systems, temperature swing adsorption (TSA) systems, and the like.

The air separation unit 120 is configured to receive air 122 and condense at least a portion of the nitrogen in the air to form liquid nitrogen. The liquid nitrogen can be condensed using compressors and/or heat exchangers and/or using other techniques known in the art for condensing liquid nitrogen. As described more fully below, a separated compressed nitrogen stream 129 is preferably a part of the cooling system that reduces the temperature of the incoming air 122. The condenser-separator unit 124 condenses the nitrogen and separates the nitrogen from the oxygen and/or other components in air 122. Separation of the liquid nitrogen from the other components of the air results in a liquid nitrogen stream 126 that is enriched in nitrogen and an oxygen-enriched stream 130 that is enriched in oxygen. The separator 124 unit may also produce salable products 132 such as but not limited to He, Ar, Xe, Kr, and additional $O_2$ and/or $N_2$. These salable products 132 can be in a liquid form and/or a gaseous form depending on the separation technique selected.

The purity of the products produced in the air separation unit 120 can depend on the process selected. In one embodiment, the carbon dioxide and oxygen in the nitrogen stream is less than 10% by weight, more preferably less than 1% by weight. Advantageously, the purity of nitrogen from the air separation unit 120 can be highly pure. This purity facilitates the use of nitrogen in a once-through system, without requiring additional purification to protect the hardware.

In one embodiment all or a portion of oxygen produced in the ASU separator 124 is optionally used as oxygen stream 130 and delivered to steam powered generation unit 160. Steam powered generation unit 160 can be any power generation system that uses steam as the working fluid. Examples of suitable steam powered systems include gasifiers, furnaces, and oxy-fired power generators. Steam powered generation unit 160 is preferably an oxy-fired power plant that utilizes the oxygen from the air separation unit 120 to produce a flue gas 162 that is substantially enriched in carbon dioxide. The carbon dioxide-enriched flue gas 162 can then be sequestered using a sequestration unit 164. Any carbon sequestering system suitable for use with oxy-fired power generation can be used. Examples of suitable oxy-fired power plants are known to those skilled in the art. For example, the present invention can be carried out in combination with oxy-fired power plants disclosed in U.S. Pat. Nos. 6,282,901, and 6,871,502, which are hereby incorporated herein by reference.

As mentioned above, the nitrogen stream 126 is a liquid nitrogen stream that is pressurized using a pump 128. Pump 128 produces a cold, pressurized nitrogen stream 129. The pressurized nitrogen stream 129 is pressurized to have a desired pressure for performing work in turbine 142 of nitrogen powered generation unit 140 and/or for storage in vessel 144. The pressurized nitrogen stream is warmed in heat exchanger 132 as it cools air 122. After warming in heat exchanger 132, pressurized nitrogen stream 129 is delivered to nitrogen powered generating unit 140 for expansion in turbine 142 and/or for storage in vessel 144. While storage vessel 144 is shown "in-line" in FIG. 2, storage vessel 144 can be off-line from nitrogen powered generating unit 140, as described more fully below.

In a preferred embodiment, the pressurized nitrogen stream is heated to a temperature above ambient using a waste stream 166 from steam powered generation unit 160. For example, nitrogen stream 129 can be heated in heat exchanger 146 using waste stream 166, and return stream 168 is returned to steam powered generator unit 160 in a closed loop system. In this embodiment, the heating of the pressurized nitrogen stream 129 and the cooling of the steam in steam powered generator unit 160 is a beneficial exchange of energy for both nitrogen powered generator unit 140 and steam powered generator unit 160. Heating pressurized nitrogen stream 129 using waste heat from waste stream 166 saves the energy that would have to be expended via furnace 148 to heat pressurized nitrogen stream 129. And, cooling waste stream 166 saves water that would typically be consumed to cool waste steam 166.

The pressurized nitrogen stream is heated using furnace 148 to reach the operating temperature and pressure in turbine 142. In one embodiment, the pressurized nitrogen is heated to a temperature in a range from about 150° C. to about 800° C., more preferably in a range from about 200° C. to about 600° C.

Furnace 148 can have any configuration suitable for heating a pressurized nitrogen stream. Typically the temperature of the furnace is selected to control the pressure of the nitrogen across the turbine. The higher the temperature, generally the higher the pressure across the turbine, all other things being equal. In one embodiment, the ratio of the pressure across the turbine is at least 1.8, more preferably the ratio is in a range from about 2 to about 100, more preferably about 5 to about 80 and most preferably at least about 10 to about 60.

The expanded nitrogen 150 expelled from the turbine is vented to ambient air. The nitrogen is used in a once-through or open-loop fashion to avoid the inefficiencies associated with recompressing the gaseous nitrogen. However, venting to ambient air can also include running the expanded nitrogen through a heat exchanger to recover a portion of the heat remaining in the expanded nitrogen, if desired.

The nitrogen powered turbine 142 produces electrical power 152 that is delivered to power grid 190. Power demand on power grid 190 is met at least in part by electrical power 152 from nitrogen powered generator unit 140 and from electrical power 170 produced in steam powered generator unit 160.

Power grid 190 includes a plurality of businesses or homes, represented by homes 192 and 194. The power grid 190 has a power demand that varies over time. The variation in power demand produces periods of high power demand and periods of low power demand.

The pressurized nitrogen represents a potential means of energy storage to smooth out periods of high power demand and periods of low power demand on grid 190. Vessel 144 shown in FIG. 2 can be used for high pressure storage of the pressurized nitrogen stream. In this embodiment, as excess energy is available from the power plant or an intermittent source such as a windmill or solar panel (e.g., intermittent source 180), the excess power is used to increase the pressure of the nitrogen in vessel 144. For example, during periods of low power demand and/or during periods of high power production from intermittent power source 180, pump 128 can be driven by electrical power 182 or electrical power 170 to increase the pressure of nitrogen stored in vessel 144. In general, the higher the pressure of nitrogen in vessel 144, the more work that can be performed per unit volume of stored gas or liquid.

The size of the storage tank depends on the amount of required energy storage and on engineering limitations for high-pressure facilities. Either a multi-vessel storage system or, more cost effectively, a system requiring a single vessel but still providing for storage provide the energy storage capabilities. Storage can occur at any system pressure from the peak pressure in the system to minimize storage volume to low-pressure storage if natural and commonly non-impervious caverns (caves, salt domes, abandoned mines, etc.) are available. High-pressure storage minimizes tank volume, but the high-pressure storage tank increases the total capital cost.

The power required for compression can come from steam powered generator 160 and/or an intermittent source such as windmills. In an alternative embodiment, the intermittent source can be connected to the grid and pump 128 can be powered from the grid during periods of low power demand and/or ample intermittent sources of power. Turbine 142 regenerates stored power during high-demand or high-revenue cycles. This energy storage scheme increases profitability. In grid systems involving potentially highly variable wind, solar, or other power generation that represents a barrier to additional renewable capacity, as is the case in Denmark and other regions with large intermittent wind sources, this energy storage capability also provides the mechanism to more effectively manage the grid and thereby enable increased renewable wind capacity.

Essentially all grid systems involve daily power demand cycles with large differences from peak to low points. Perhaps more significantly, the energy storage feature helps solve the system-wide problem of meeting peak demand even as carbon capture technology decreases net effective capacity by shifting the load to lower demand times and using storage to compensate during high demand. This solution to load requirements can postpone or eliminates the need to construct new generation capacity for $CO_2$ mitigation. To the extent that compression represents a sunk cost and parasitic loss for $CO_2$ sequestration, the effective efficiency and cost of the energy storage are turbine efficiencies (typically 85-90%) and the cost of the pressure vessel.

A primary feature of one embodiment of the invention is that both energy storage and $CO_2$ capture can occur simultaneously. In most cases, the energy storage efficiency and cost effectiveness of this process compete well with alternative systems that provide only energy storage or only $CO_2$ capture. Since this process can be embodied to provide both storage and capture simultaneously with energy and capital costs potentially comparable to only one of these processes by alternative means, this combined process can have substantial energy, capital, and operating cost savings relative to competing processes.

Energy storage issues loom larger in the overall carbon capture and storage (CCS) discussion than seems to be generally acknowledged. All well-documented CCS systems consume large amounts of power, typically 25-30% of a plant net output. Accordingly, an additional 25-30% capacity is required to implement these processes just to maintain current peak capacity. As nearly all power suppliers operate near capacity limits during peak loads, CCS requires either an additional 25-30% of new capacity or sufficient energy storage to levelize peak loads. This issue affects nearly every power system that implements CCS. Independently of CCS, projected new power demands and more efficient capital utilization both would benefit from cost- and energy-effective energy storage. Finally, some regions have large but intermittent energy supplies, such as windmills and solar panels. Management of these highly and rapidly varying supplies limits the amount of usable energy they can provide. Energy storage helps accommodate these large yet highly variable energy supplies. In summary, the three energy storage issues addressed here are: (1) increased peak power demands associated with CCS generally; (2) load leveling generally to increase capital effectiveness, system efficiency, and increased power demand; and (3) integration of windmills and other non-dispatchable, highly variable power supplies in a grid.

The systems and process of the invention can resolve some or all of the issues outlined above. The simplest resolution somewhat mitigates the third issue—the effects of windmills or other large but intermittent energy supplies on the grid—with virtually no additional equipment beyond a robust grid and properly installed compressor motors. Either the local power plant or the grid can supply the large compression-energy requirements. In normal (no wind) operation, the local power plant provides the compression power, which represents a large parasitic loss. When excess wind or other intermittent energy is available, it drives the compressors, reducing the parasitic losses to the power plant and therefore reducing coal/natural gas/oil/biomass consumption. Current power plants do not have such large parasitic loads and can do little to absorb the energy fluctuations from the mills. Many alternative CCS technologies (essentially all solvent absorption systems) use energy in the form of heat, which is not efficiently replaceable by wind energy. However, systems that use air separation units can effectively use the excess wind energy to drive the compressors and provide useful grid management options to absorb large amounts of excess wind energy and reduce boiler load by an equivalent amount.

Wind energy supplies commonly change on much shorter time scales than boilers can accommodate. The high energy storage embodiments of the invention can advantageously provide load leveling for these systems. There is little or no additional efficiency drops or increased loads associated with compression of liquid nitrogen, and the effective efficiency of the energy storage becomes the turbine efficiency, not the product of the turbine and compressor efficiencies and other system losses. In this sense, compressed gas storage integrated with the proposed carbon sequestration system provides energy storage with greater efficiency than existing hydro-pumped storages systems.

There are additional capital costs associated with providing containment and valving for the compressed gas storage. The specific design of such containment strongly depends on site-specific details. Sites that have natural caverns (salt domes, mine shafts, caves, etc.) suitable for compressed gases can provide relatively large and inexpensive storage, albeit generally at low pressures. Sites with footprint constraints generally would use tall manufactured high-pressure tanks for storage. Both systems need nitrogen turbine systems with capacities that exceed the full-load capacity of the boiler, since at peak times the boiler would generally operate at full load and the energy storage would also operate at maximum load.

In a preferred embodiment, the storage vessel is sized and configured to store at least about 0.5 hour, about 1 hour, about 2 hours, or at least about 4 hours of full-load plant output. In one embodiment, the energy storage can be provided by a series of comparably tall but smaller diameter (and wall thickness) storage vessels. The 2-hour 100% capacity storage amount functionally represents about 8 hours of peaking capacity. That is, if the equivalent of ¼ of the full plant output is stored for eight hours, the result is a 2-hour full-flow-equivalent storage. This amount of storage suffices to accommodate most wind surges from mills and daily cycles in plant operation. The tank size (or number) increases proportionally with storage capacity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficiently generating power from a turbine using nitrogen, comprising:

providing a gas stream that includes nitrogen and oxygen;

condensing at least a portion of the nitrogen in the gas stream to form liquid nitrogen and separated liquid nitrogen;

separating at least a portion of the liquid nitrogen from the carbon dioxide and/or oxygen to produce a separated nitrogen-rich stream comprised of liquid nitrogen and a separated oxygen-rich stream;

using the separated oxygen-rich stream in an oxy-fired hydrocarbon processing plant, gasifier or furnace to produce steam;

pressurizing the separated nitrogen-rich stream comprised of liquid nitrogen to a pressure of at least 1.8 atmosphere;

heating the pressurized nitrogen-rich stream in a heat exchanger using a portion of the steam and further heating the nitrogen-rich stream from the heat exchanger in a furnace to form a heated nitrogen-rich stream comprised of gaseous nitrogen and having a temperature greater than 100° C.; and expanding the heated, separated nitrogen-rich stream in a turbine to produce power.

2. A method as in claim 1, further comprising storing the pressurized nitrogen-rich stream comprised of liquid nitrogen in a storage vessel and periodically releasing the pressurized nitrogen-rich stream from the storage vessel to produce turbine generated power.

3. A method as in claim 1, wherein the gas stream further comprises carbon dioxide, and wherein the separation step also produces a carbon dioxide-rich stream, the method further comprising collecting at least a portion of the carbon dioxide-rich stream.

4. A method as in claim 1, further comprising collecting at least a portion of flue gas from the oxy-fired hydrocarbon processing plant and sequestering carbon dioxide therein.

5. A method as in claim 1, wherein after expanding the heated nitrogen in the turbine, the nitrogen is vented into ambient air.

6. A method as in claim 1, wherein a pressure ratio across the turbine is in a range from about 2 atmospheres to about 100 atmospheres.

7. A method as in claim 1, wherein a pressure ratio across the turbine is in a range from about 5 atmospheres to about 80 atmospheres.

8. A method as in claim 1, wherein the nitrogen-rich stream is heated to a temperature in a range from about 150° C. to about 800° C.

9. A method as in claim 1, wherein the nitrogen-rich stream is heated to a temperature in a range from about 200° C. to about 600° C.

10. A method as in claim 1, wherein the concentration of oxygen and carbon dioxide in the nitrogen-rich stream is less than 10% by weight.

11. A method as in claim 1, wherein storing at least a portion of the pressurized nitrogen-rich stream in the storage vessel occurs during a period of low power demand, and wherein releasing at least a portion of the stored pressurized nitrogen-rich material from the storage vessel occurs during a period of high power demand.

12. A system for efficiently generating power from a turbine using a pressurized nitrogen-rich stream, comprising:
a stationary power generating plant comprising:
oxy-fired hydrocarbon processing unit, gasifier or furnace configured to generate steam;
a turbine to generate power;
a heat exchanger configured to receive a portion of the steam;
a condenser configured to condense nitrogen in a gas stream containing nitrogen and oxygen and from liquid nitrogen;
a separator configured to separate at least a portion of the liquid nitrogen from the oxygen and produce a nitrogen-rich stream comprised of liquid nitrogen and a separated oxygen-rich stream;
a conduit for delivering the separated oxygen-rich stream in the oxy-fired hydrocarbon processing unit, gasifier or furnace;
a pump fluidly coupled to the nitrogen-rich stream from the separator and configured to pressurize the nitrogen-rich stream comprised of liquid nitrogen to at least 1.8 atmospheres;
a conduit for delivering at least a portion of the pressurized nitrogen-rich stream from the pump to a pressurized storage vessel configured for storage and periodic release of pressurized nitrogen-rich material;
a conduit for delivering a pressurized nitrogen-rich material to the heat exchanger, wherein the heat exchanger is configured to transfer heat from the steam to the pressurized nitrogen-rich material;
a furnace configured to further heat the pressurized nitrogen-rich material from the heat exchanger to form a heated nitrogen-rich stream comprised of gaseous nitrogen to a temperature greater than 100° C.; and
a conduit for delivering the heated nitrogen-rich stream to the turbine.

13. A system as in claim 12, further comprising a heat exchanger configured to cool air using the pressurized nitrogen-rich stream.

14. A method as in claim 12, wherein the pump is configured to pressurize the nitrogen-rich stream comprised of liquid nitrogen to a pressure in a range from about 5 atmospheres to about 80 atmospheres.

15. A system as in claim 12, wherein the system is configured to vent nitrogen expanded in the turbine to ambient air.

16. A system as in claim 12, further comprising a steam powered turbine configured to generate power using steam in a closed loop system, wherein the closed loop system produces waste heat and wherein the system is configured so that the waste heat is used to heat the pressurized nitrogen-rich stream prior to heating the pressurized nitrogen-rich stream in the furnace.

17. A system as in claim 12, further comprising an intermittent power source electrically coupled to the pump that pressurizes the liquid nitrogen-rich stream.

18. A system as in claim 17, wherein the intermittent power source comprises at least one windmill or solar panel.

* * * * *

UNITED STATES PATENT AND TRADEMARK OFFICE
CERTIFICATE OF CORRECTION

| | | |
|---|---|---|
| PATENT NO. | : 8,963,347 B2 | Page 1 of 2 |
| APPLICATION NO. | : 12/745680 | |
| DATED | : February 24, 2015 | |
| INVENTOR(S) | : Baxter | |

It is certified that error appears in the above-identified patent and that said Letters Patent is hereby corrected as shown below:

Drawings
Fig. 2, add reference "100" as shown on the attached page

Specification
Column 2
Line 34, change "reduced" to --reduce--
Line 61, change "unites" to --units--

Column 3
Line 37, change "ambient, the" to --ambient temperature, the--

Column 4
Line 30, change "gas" to --gases--

Signed and Sealed this
Eighth Day of March, 2016

Michelle K. Lee
*Director of the United States Patent and Trademark Office*